(12) United States Patent
Jensen et al.

(10) Patent No.: US 7,215,703 B2
(45) Date of Patent: May 8, 2007

(54) DIGITAL CALCULATION RECEIVED SIGNAL STRENGTH INDICATION

(75) Inventors: Henrik T. Jensen, Long Beach, CA (US); Brima B. Ibrahim, Los Angeles, CA (US)

(73) Assignee: Broadcom Corporation, Irvine, CA (US)

( * ) Notice: Subject to any disclaimer, the term of this patent is extended or adjusted under 35 U.S.C. 154(b) by 790 days.

(21) Appl. No.: 10/367,492

(22) Filed: Feb. 14, 2003

(65) Prior Publication Data

US 2004/0161026 A1    Aug. 19, 2004

(51) Int. Cl.
*H04B 17/00*    (2006.01)
(52) U.S. Cl. .................. 375/224; 375/227; 375/147; 375/316; 375/345
(58) Field of Classification Search ............... 375/224, 375/227, 147, 316; 455/226.2
See application file for complete search history.

(56) References Cited

U.S. PATENT DOCUMENTS

| 4,481,484 | A | * | 11/1984 | Campbell | .................... 331/12 |
| 5,117,231 | A | * | 5/1992 | Yaron | ......................... 342/195 |
| 6,226,271 | B1 | * | 5/2001 | Dent | ........................... 370/252 |
| 6,546,047 | B1 | * | 4/2003 | Chen et al. | ................. 375/229 |
| 6,843,597 | B1 | * | 1/2005 | Li et al. | ..................... 375/345 |
| 2004/0017865 | A1 | * | 1/2004 | Litwin et al. | ............... 375/345 |

* cited by examiner

*Primary Examiner*—Mohammed Ghayour
*Assistant Examiner*—Leila Malek
(74) *Attorney, Agent, or Firm*—Garlick Harrison & Markison; Timothy W. Markison; Bruce E. Stuckman

(57) ABSTRACT

Digital calculation of an RSSI value begins by digitally calculating a magnitude of a signal (e.g., a received RF signal or representation thereof). The process then continues by filtering the magnitude of the signal to produce a filtered magnitude signal. The process then continues by determining a coarse RSSI value of the filtered magnitude signal, wherein the coarse RSSI value indicates a sliding window of RSSI values. Once the coarse RSSI value is obtained, the process continues by determining a fine RSSI value within the sliding window of RSSI values. The process concludes by summing the fine RSSI value with the coarse RSSI value to produce a digital RSSI value.

19 Claims, 6 Drawing Sheets

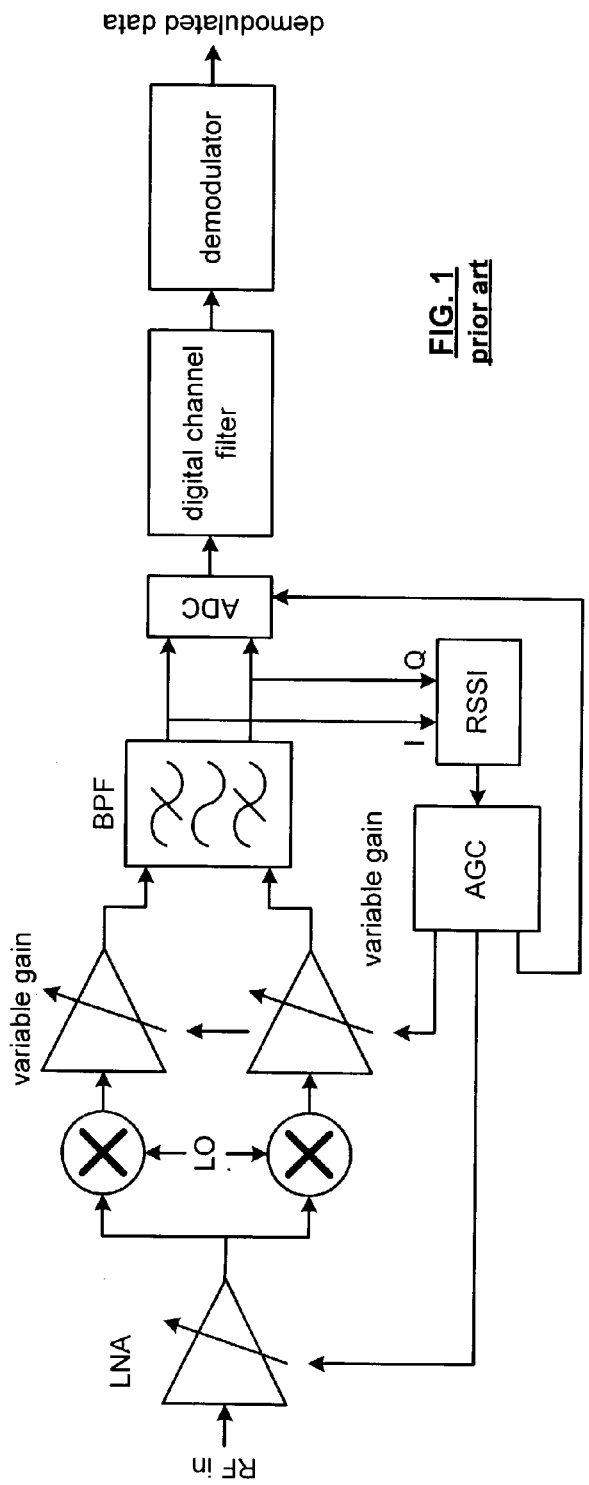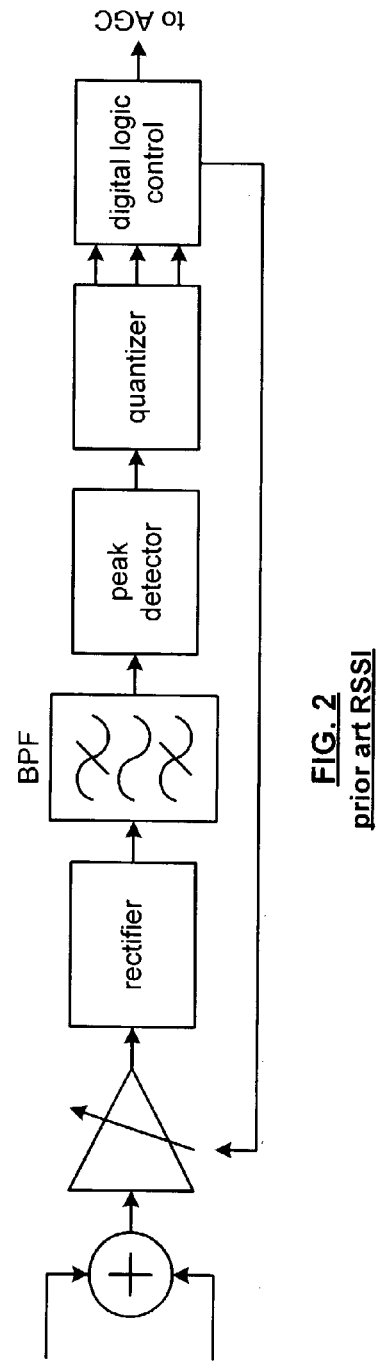
FIG. 1
*prior art*
FIG. 2
*prior art RSSI*

DIGITAL CALCULATION RECEIVED SIGNAL STRENGTH INDICATION

BACKGROUND OF THE INVENTION

1. Technical Field of the Invention

This invention relates generally to wireless communication systems and more particularly to radio frequency integrated circuits used in such wireless communication systems.

2. Background of the Invention

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with the particular wireless communication standard. The one or more intermediate frequency stages mix the baseband signals with one or more local oscillations to produce RF signals. The power amplifier amplifies the RF signals prior to transmission via an antenna.

FIG. 1 is a schematic block diagram of a prior art receiver that may be used as part of the built-in radio transceiver. The receiver includes a low noise amplifier (LNA), mixer stage, band pass filter (BPF), analog to digital converter (ADC), digital channel filter, demodulator, a received signal strength indication (RSSI) module, and an automatic gain control (AGC) module. In operation, the low-noise amplifier (LNA) amplifies a radio frequency signal (RF in) to a level acceptable for processing in subsequent stages of the receiver. The mixer stage, which includes mixers and the variable gain blocks, translates the RF input signal to a low or zero intermediate frequency (IF) signal. The band pass filter filters the low or zero IF signal, which is subsequently converted into a digital low or zero IF signal by the analog-to-digital converter. A digital processor, which performs the digital channel filtering and digital demodulation, recaptures the raw data contained in the received RF signal.

Vital to the operation of the receiver is the accurate and timely setting of the controls of the variable gain blocks, the LNA, and possibly the ADC based on the strength of the received signal. If the gain controls are set inappropriately, the receiver may suffer from reduced sensitivity or may malfunction due to node saturation.

The automatic gain control (AGC) algorithm drives the controls of the variable gain blocks in the receiver to desired settings that allow the receiver to operate optimally. The AGC employs some feedback control law to ensure that the setting of the gain controls occurs in a timely manner. However, proper operation of the AGC algorithm depends upon the availability of an accurate and nearly-instantaneous indication of the strength of the received signal, which is provided by an analog Receiver Signal Strength Indication (RSSI) module.

FIG. 2 is a schematic block diagram of the analog RSSI module, which includes a stage that combines the in-phase and quadrature (I & Q) components of the filtered received signal, a variable gain stage, a rectifier, a band pass filter (BPF), a peak detector, a log-domain uniform quantizer, and some digital control logic.

The rectifier rectifies the received sinusoidal signal, where the rectified sinusoidal signal is subsequently filtered, via the band pass filter, to attenuate noise components and to smooth the rectified signal. The peak detector registers the amplitude of the filtered rectified signal, which is quantized to a desired resolution by a log-domain uniform quantizer to produce a quantizer thermometer output code. The digital logic converts the quantizer thermometer output code to an appropriate digital representation. Since most signal processing in the RSSI blocks is analog, it suffers from relatively high die area requirement, relatively high power consumption, and imprecision due to process and temperature variations.

Therefore, a need exists for a method and apparatus that substantially overcome the relatively high die area, the relatively high power consumption, and the imprecision of analog RSSI modules.

BRIEF SUMMARY OF THE INVENTION

The digital calculation of received signal strength indication (RSSI) of the present invention substantially meets these needs and others. In one embodiment, the digital calculation of an RSSI value begins by digitally calculating a magnitude of a signal (e.g., a received PR signal or representation thereof). The process then continues by filtering the magnitude of the signal to produce a filtered magnitude signal. The process then continues by determining a coarse RSSI value of the filtered magnitude signal, wherein the coarse RSSI value indicates a sliding window of RSSI values. Once the coarse RSSI value is obtained, the process continues by determining a fine RSSI value within the sliding window of RSSI values. The process concludes by summing the fine RSSI value with the coarse RSSI value to produce a digital RSSI value. Such a method substantially overcomes the relatively high die area, the relatively high power consumption, and the imprecision of analog RSSI modules.

In another embodiment, the digital calculation of an RSSI value begins by digitally calculating a magnitude signal from a digital low intermediate frequency (IF) signal. The process continues by determining a range of RSSI values from the magnitude signal. The process concludes by determining the RSSI value within the range of RSSI values. Such a method substantially overcomes the relatively high die area, the relatively high power consumption, and the imprecision of analog RSSI modules.

BRIEF DESCRIPTION OF THE SEVERAL VIEWS OF THE DRAWINGS

FIG. 1 is a schematic block diagram of a prior art receiver;

FIG. 2 is a schematic block diagram of a prior art analog RSSI module;

DETAILED DESCRIPTION OF THE INVENTION

Figure 3:
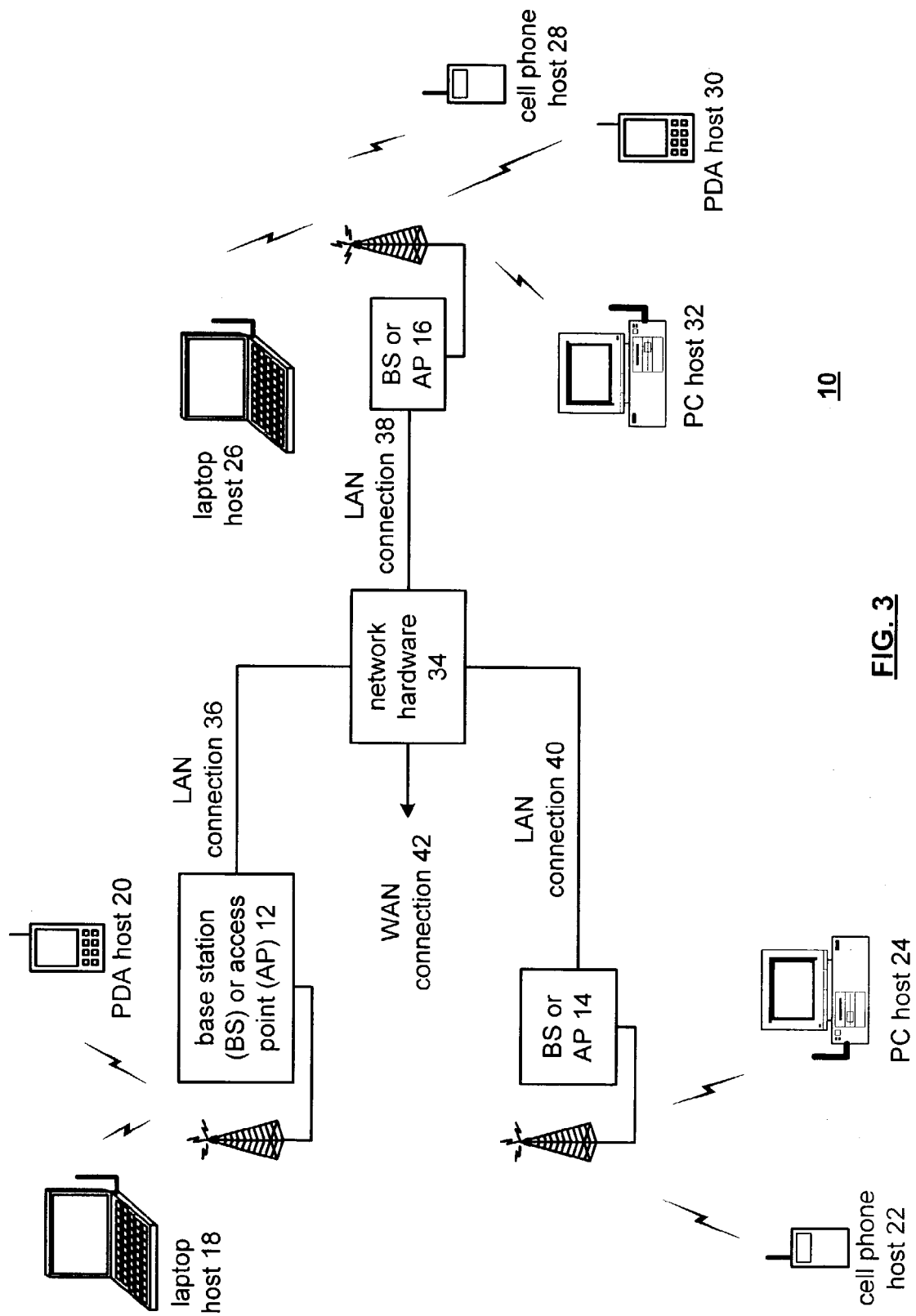
FIG. 3 is a schematic block diagram of a wireless communication system in accordance with the present invention.

FIG. 3 is a schematic block diagram illustrating a communication system 10 that includes a plurality of base stations and/or access points 12–16, a plurality of wireless communication devices 18–32 and a network hardware component 34. The wireless communication devices 18–32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 4.

The base stations or access points 12–16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12–16 has an associated antenna or antenna array to communicate with the wireless communication devices in its area. Typically, the wireless communication devices register with a particular base station or access point 12–14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Figure 4:
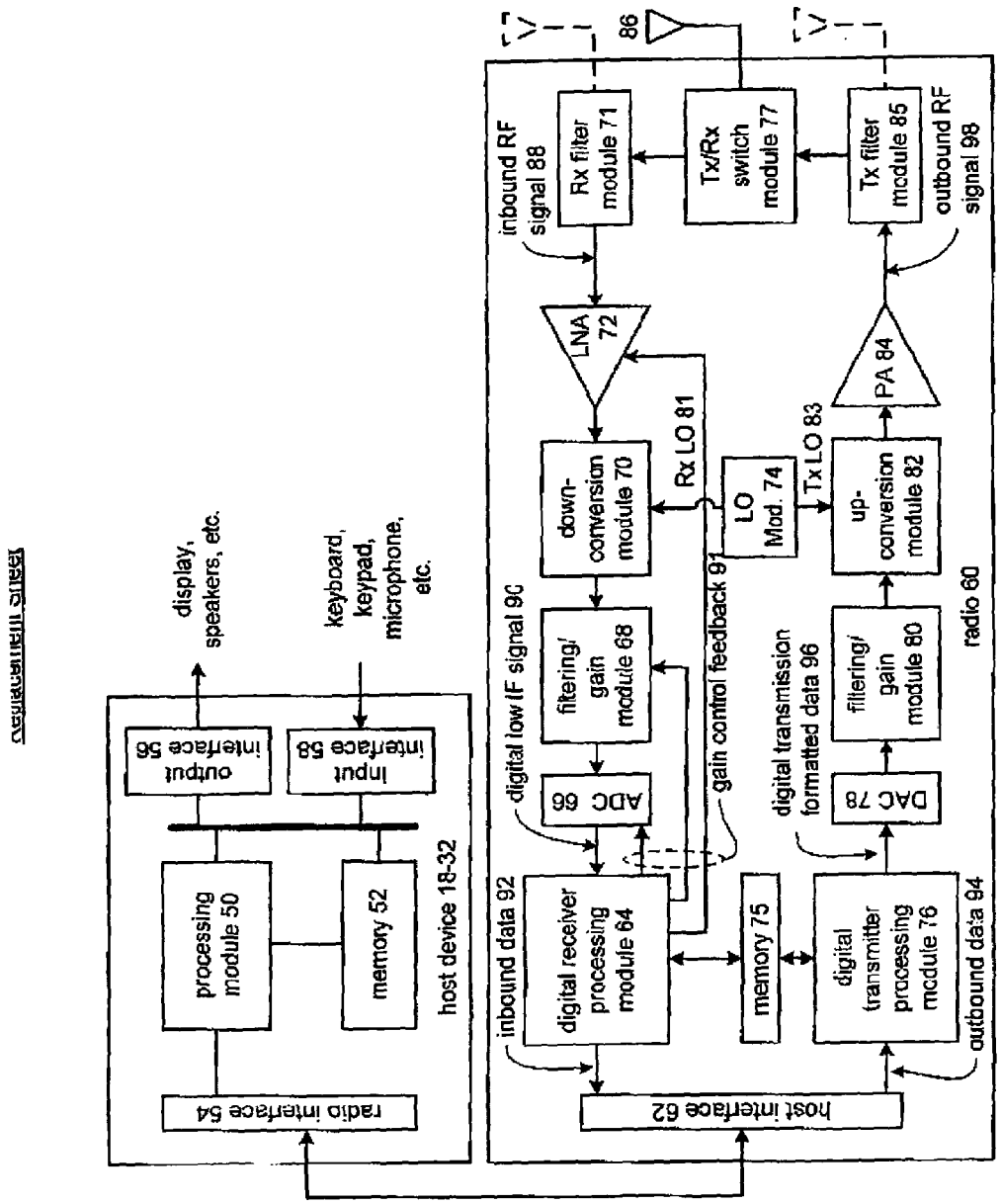
FIG. 4 is a schematic block diagram of a wireless communication device in accordance with the present invention.

FIG. 4 is a schematic block diagram illustrating a wireless communication device that includes the host device 18–32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18–32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a filtering/attenuation module 68, an IF mixing down conversion stage 70, a receiver filter 71, a low noise amplifier 72, a transmitter/receiver switch 77, a local oscillation (LO) module 74, memory 75, a digital transmitter processing module 76, a digital-to-analog converter 78, a filtering/gain module 80, an IF mixing up conversion stage 82, a power amplifier 84, a transmitter filter module 85, and an antenna 86. The antenna 86 may be a single antenna that is shared by the transmit and receive paths as regulated by the Tx/Rx switch 77, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital receiver processing module 64 also digitally calculates RSSI values and generates therefrom at least one gain control feedback signal 91 that is provided to the ADC 66, the filter/gain module 68, and/or the LNA 72. The details of the digital calculation of the RSSI value will be described in greater detail with reference to FIGS. 5–9.

The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory 75 stores, and the processing module 64 and/or 76 executes, operational instructions corresponding to at least some of the functions illustrated in FIGS. 5–9.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE802.11a, IEEE802.11b, IEEE802.11g, Bluetooth, et cetera) to produce digital transmission formatted data 96. The digital transmission formatted data 96 will be a digital base-band signal or a digital low IF signal, where the low IF typically will be in the frequency range of one hundred kilohertz to a few megahertz.

The digital-to-analog converter 78 converts the digital transmission formatted data 96 from the digital domain to the analog domain. The filtering/gain module 80 filters and/or adjusts the gain of the analog signal prior to providing it to the IF mixing stage 82. The IF mixing stage 82 directly converts the analog baseband or low IF signal into an RF signal based on a transmitter local oscillation 83 provided by local oscillation module 74, which may be implemented in accordance with the teachings of the present invention. The power amplifier 84 amplifies the RF signal to produce outbound RF signal 98, which is filtered by the transmitter filter module 85. The antenna 86 transmits the outbound RF signal 98 to a targeted device such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the receiver filter module 71 via the Tx/Rx switch 77, where the Rx filter 71 bandpass filters the inbound RF signal 88. The Rx filter 71 provides the filtered RF signal to low noise amplifier 72, which amplifies the signal 88 to produce an amplified inbound RF signal. The low noise amplifier 72 provides the amplified inbound RF signal to the IF mixing module 70, which directly converts the amplified inbound RF signal into an inbound low IF signal or baseband signal based on a receiver local oscillation 81 provided by local oscillation module 74, which may be implemented in accordance with the teachings of the present invention. The down conversion module 70 provides the inbound low IF signal or baseband signal to the filtering/attenuation module 68. The filtering/gain module 68 filters and/or gains the inbound low IF signal or the inbound baseband signal to produce a filtered inbound signal.

The analog-to-digital converter 66 converts the filtered inbound signal from the analog domain to the digital domain to produce digital low IF signal 90. The digital receiver processing module 64 decodes, descrambles, demaps, calculates an RSSI value, and/or demodulates the digital low IF signal 90 to recapture inbound data 92 in accordance with the particular wireless communication standard being implemented by radio 60. The host interface 62 provides the recaptured inbound data 92 to the host device 18–32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 5:
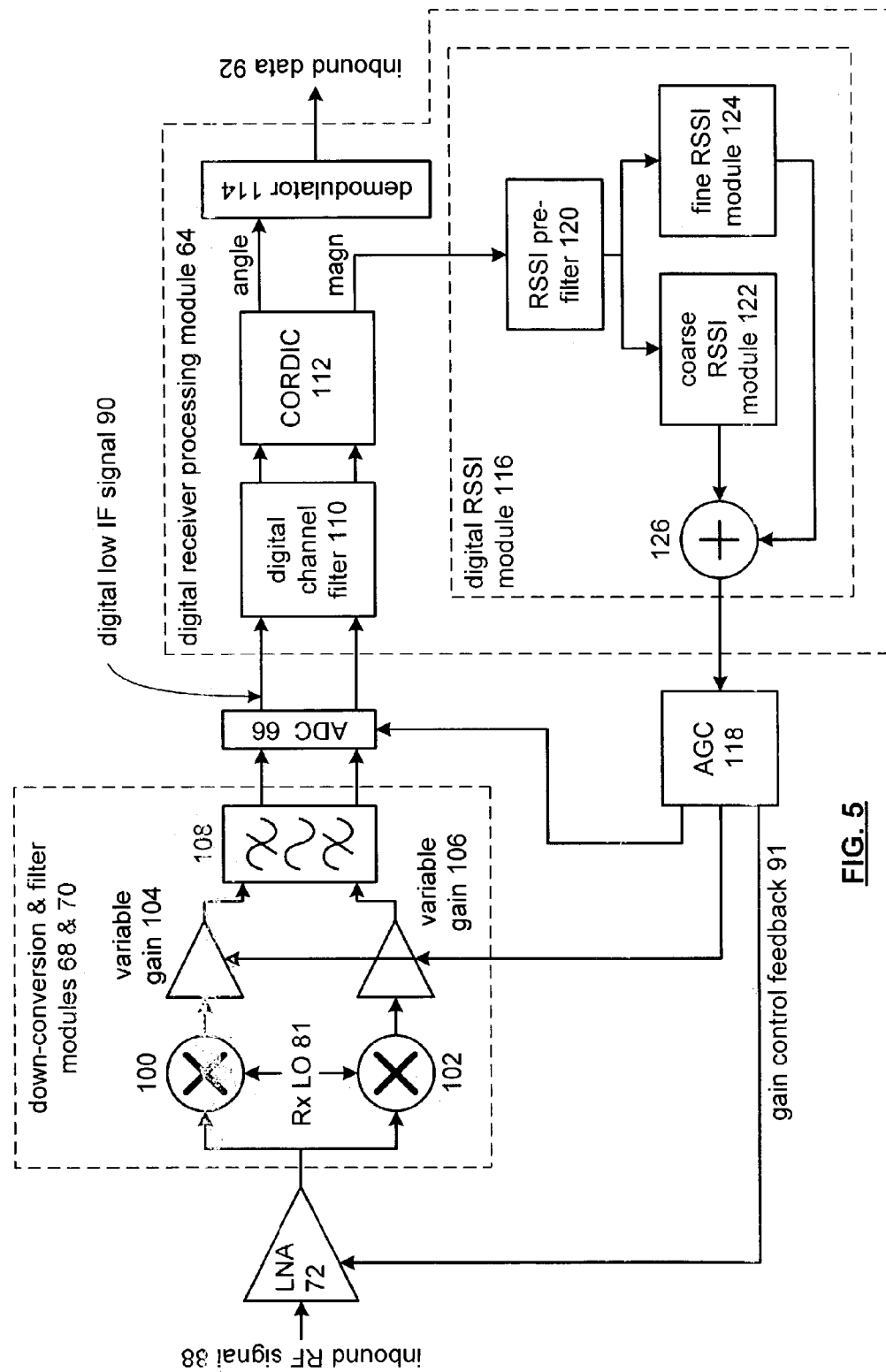
FIG. 5 is a schematic block diagram of a wireless radio frequency receiver in accordance with the present invention.

FIG. 5 is a schematic block diagram of a receiver in accordance with the present invention. The receiver includes the LNA 72, the down-conversion and filter modules 68 and 70, the analog to digital converter 66, and the digital receiver processing module 64. The down conversion and filter modules 68 and 70 include mixers 100 and 102, variable gain modules 104 and 106, and a band pass filter 108. The digital receiver processing module 64 is configured to function as a digital channel filter 110, a CORDIC (COordinate Rotation DIgital Computer) block 112, a demodulator 114, and a digital RSSI module 116. The digital RSSI module 116 includes an RSSI pre-filter module 120, a coarse RSSI module 122, a fine RSSI module 124, and a summing module 126.

In operation, the LNA 72 amplifies, based on an LNA gain control feedback signal 91, the inbound RF signal 88 to produce an amplified RF signal. The down conversion and filter modules 68 and 70 convert, based on a variable gain block control feedback signal 91, the amplified RF signal to produce a low IF or zero IF signal having an in-phase (I) component and a quadrature (Q) component. The analog to digital converter 66 converts the I and Q components into digital I and Q components to represent the digital low IF signal 90.

The digital channel filter 110 filters the digital I and Q components to produce filtered digital I and Q components. The CORDIC 112, which is commonly used in digital receivers, is a hardware efficient method of extracting angle and magnitude (magn) information from the filtered digital I and Q components. The RSSI pre-filter module 120 attenuates noise-introduced variations on the magnitude output of the CORDIC by filtering the magnitude component using an appropriate digital low pass filter. Typically, a comb filter would be used for this filtering task, where the narrowness of the filter is a determining factor in the resulting accuracy of the RSSI algorithm. Next, the RSSI algorithm proceeds by dividing the RSSI calculation into a coarse (e.g., 6 dBm multiple) and a fine (e.g., 1 dBm multiple) components via the fine and coarse RSSI modules 122 and 124. The resulting coarse and fine RSSI values are added, via the summing module 126, to form the final RSSI output with respect to the ADC input.

The following provides an example algorithm for digitally calculating an RSSI value.

```
loop every usec
    in=rssi_prefilter_output;
    FineRssi=0;
    CoarseRssi=0;
    NoOfAttempts=1;
    [FineRssi,Found]=PowerLUT(in,RefLevels);
    while (~Found) & (NoOfAttempts < 9)
        NoOfAttempts=NoOfAttempts+1;
        in=in*2;
        CoarseRssi=CoarseRssi−6;
        [FineRssi,Found]=PowerLUT(in,RefLevels);
    end
    if ~Found
        FineRssi=0;
        CoarseRssi=−54;
    end
    Rssi=FineRssi+CoarseRssi;
end
function [FineRssi,Found] =
    PowerLUT(x0,RefLevels)
Found=TRUE;
if x0 >= RefLevels(1)
    FineRssi=0;
    elseif x0 >= RefLevels(2)
        FineRssi=−1;
        elseif x0 >= RefLevels(3)
            FineRssi=−2;
            elseif x0 >= RefLevels(4)
                FineRssi=−3;
                elseif x0 >= RefLevels(5)
                    FineRssi=−4;
                    elseif x0 >= RefLevels(6)
                        FineRssi=−5;
                    else
                        Found=FALSE;
```

As can be ascertained from the above example algorithm, the splitting of the algorithm into two components provides for a hardware efficient solution; each 6 dB sub-range corresponds to an octave (multiply-by-two or "left shift") of the signal amplitude and the resolution of 1 dB within each octave is efficiently provided by a look-up table (LUT). For optimal speed, the search within the LUT could be based upon a binary search algorithm.

The example RSSI algorithm has a dynamic range of 54 dB relative to the ADC full scale input, i.e., $RSSI_{ADC,DR}=54$ dB. To determine the dynamic range of the RSSI algorithm relative to the receiver LNA input, notice that the maximum detectable input signal, $S_{Max}$, is found according to $$S_{Max} = \frac{\max\{ADC_{FS}\}}{(\text{Min. Receiver Gain})},$$

where max$\{ADC_{FS}\}$ denotes the maximum value of the Full Scale input of the ADC, and the minimum detectable input signal, $S_{Min}$, is found according to $$S_{Min} = \frac{\min\{ADC_{FS}\}}{RSSI_{ADC,DR} \times (\text{Max. Receiver Gain})},$$

where min$\{ADC_{FS}\}$ denotes the minimum value of the Full Scale input of the ADC. It follows that the total dynamic range of the RSSI algorithm with respect to the LNA input is $$RSSI_{LNA,DR}=S_{Max}-S_{Min}.$$

As an example, suppose the ADC has binary gain control to set the Full Scale values to either −11 dBm or +4 dBm, respectively, and suppose that the receiver minimum and maximum gains are 12 dB and 45 dB, respectively. It follows that $S_{Max}$=−8 dBm and $S_{Min}$=−110 dBm, and hence $RSSI_{LNA,DR}$=102 dB.

Figure 6:
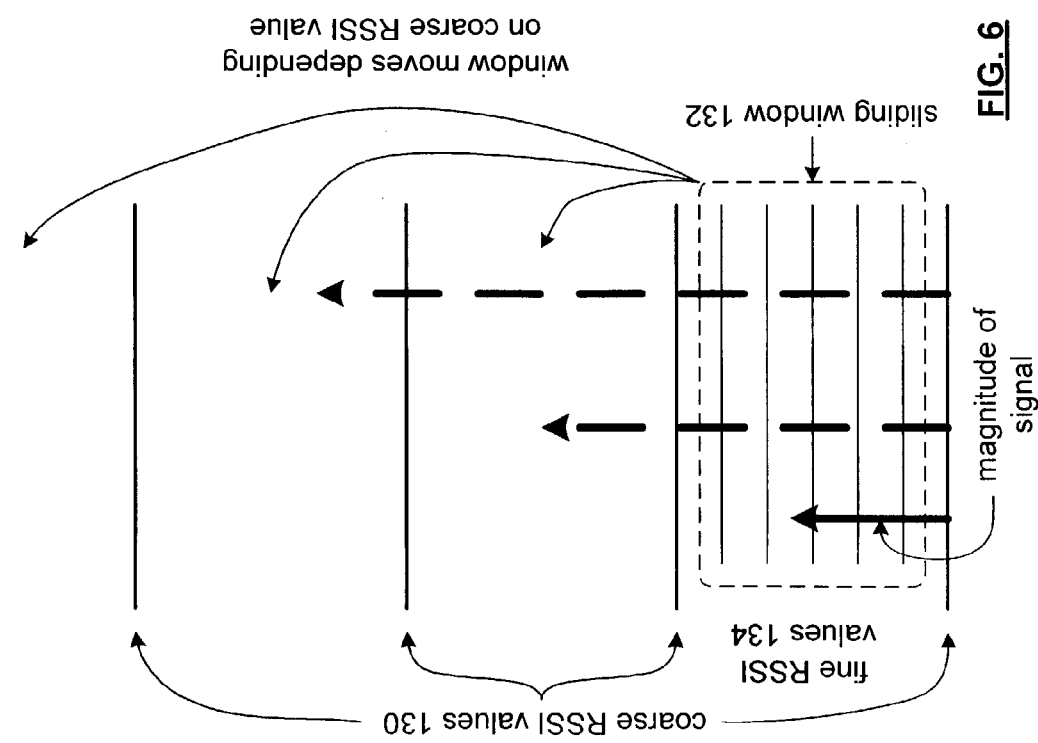
FIG. 6 is a graphical diagram of digitally calculating an RSSI value in accordance with the present invention.

FIG. 6 is a graphical example of digitally calculating an RSSI value based on the magnitude of the signal. In this example, one of a plurality of coarse RSSI values 130 is selected based on a comparison to with the magnitude of the signal. In this example, the lowest coarse RSSI value is selected. The dashed lines indicate alternate examples of the magnitude of the signal. For the first dashed line magnitude, the second lowest coarse RSSI value would be selected and for the second dashed line magnitude, the third lowest coarse RSSI value would be selected.

Once the coarse RSSI value is selected, a sliding window of fine RSSI values is aligned with the selected coarse RSSI value. With the sliding window in place, the fine RSSI value is determined and added to the selected coarse RSSI value to produce the final RSSI value. By calculating the RSSI value in a digital manner, the relatively high die area, the relatively high power consumption, and the imprecision of analog RSSI modules are substantially overcome.

Figure 7:
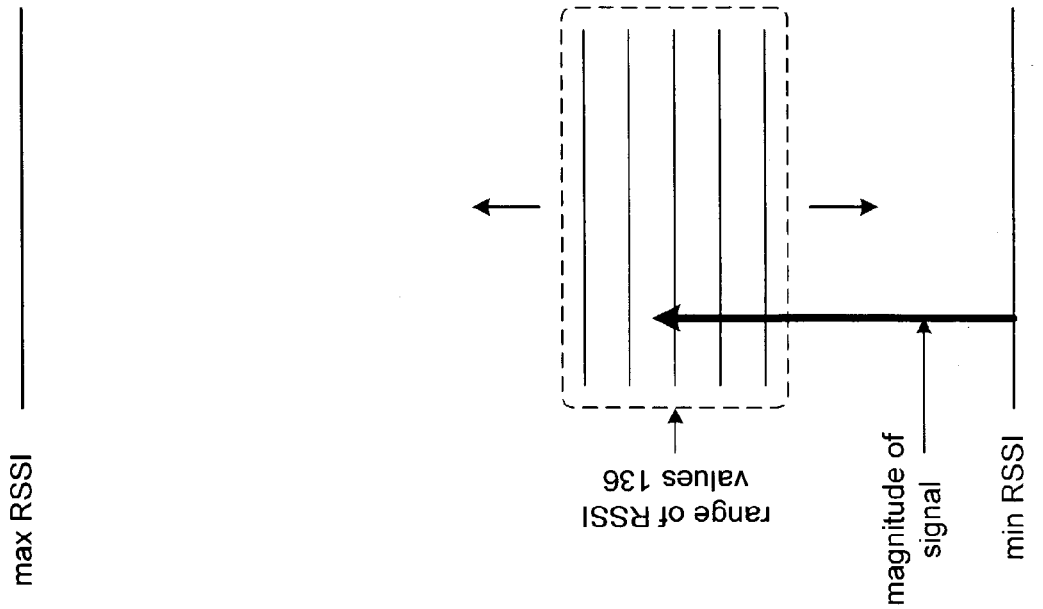
FIG. 7 is a graphical diagram of an alternate method of digitally calculating an RSSI value in accordance with the present invention.

FIG. 7 is a graphical example of digitally calculating an RSSI value based on the magnitude of the signal. In this example, a range of RSSI values is determined from the magnitude signal in a coarse manner. Once the range of RSSI values is determined, the final RSSI value is determined from within the range of RSSI values.

Figure 8:
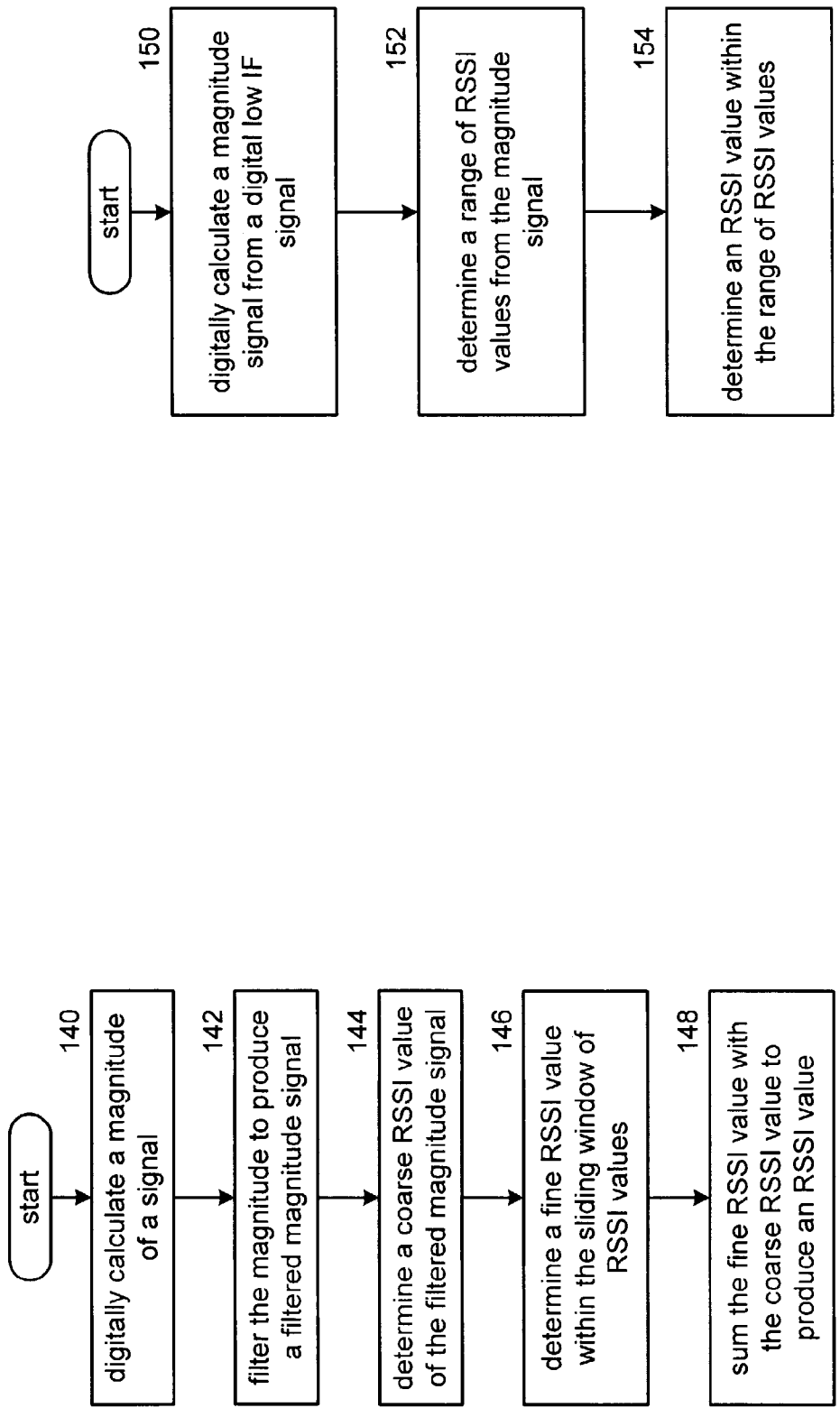
FIG. 8 is a logic diagram of a method for digitally calculating an RSSI value in accordance with the present invention.

FIG. 8 is a logic diagram of a method for calculating an RSSI value. The method begins at step 140 where a receiver digitally calculates a magnitude of a signal. The signal may correspond to a low intermediate frequency (IF) signal that been derived from a received radio frequency signal. The low IF signal is then converted into a digital low IF signal having an in-phase component and a quadrature component. The magnitude of the low IF signal may be derived by executing a CORDIC algorithm upon the digital in-phase and quadrature components.

The process then proceeds to step 142 where the receiver filters the magnitude to produce a filtered magnitude signal. The process then proceeds to step 144 where the receiver determines a coarse RSSI value of the filtered magnitude signal, wherein the coarse RSSI value indicates a sliding window of RSSI values. The coarse RSSI value may be determined by evaluating, in a decreasing order, most significant bits of the filtered magnitude signal to determine the coarse RSSI value.

The process then proceeds to step 146 where the receiver determines a fine RSSI value within the sliding window of RSSI values. This may be done by accessing a look up table to determine a corresponding reference level based on lower significant bits of the filtered magnitude signal and equating the corresponding reference level to the fine RSSI value. The process then proceeds to step 148 where the receiver sums the fine RSSI value with the coarse RSSI value to produce an RSSI value. By calculating the RSSI value in this manner, the relatively high die area, the relatively high power consumption, and the imprecision of analog RSSI modules are substantially overcome.

Figure 9:
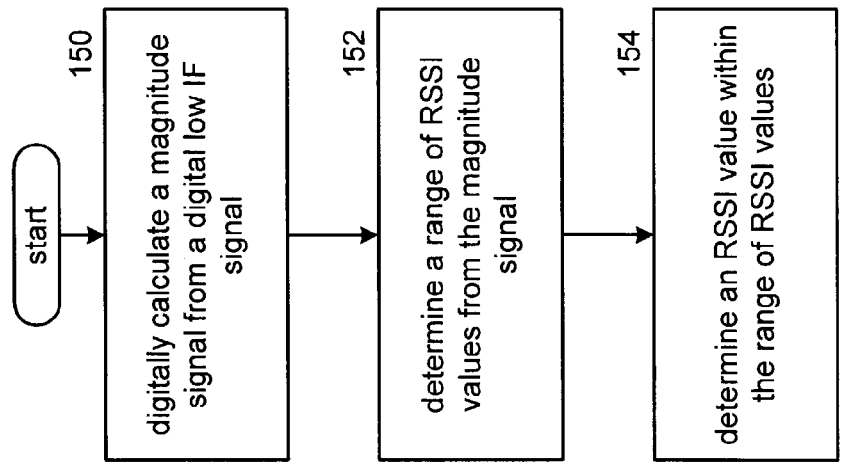
FIG. 9 is a logic diagram of an alternate method for digitally calculating an RSSI value in accordance with the present invention.

FIG. 9 is a logic diagram of method for calculating an RSSI value. The process begins at step 150 where a receiver digitally calculates a magnitude signal from a digital low intermediate frequency (IF) signal. This may be done by determining an in-phase (I) component and a quadrature (Q) component from the digital low IF signal. The magnitude is then determined from the I and Q components.

The process then proceeds to step 152 where the receiver determines a range of RSSI values from the magnitude signal. This may be done by evaluating, in a decreasing order, most significant bits of the magnitude signal to determine a boundary value of the range of RSSI values. The process then proceeds to step 154, where the receiver determines an RSSI value within the range of RSSI values. This may be done by: accessing a look up table to determine a corresponding reference level based on lower significant bits of the magnitude; equating the corresponding reference level to a fine RSSI value; and summing the fine RSSI value with a boundary RSSI value of the range of RSSI values.

The preceding discussion has presented a method and apparatus for digitally calculating a received signal strength indication (RSSI) value. By calculating the RSSI value in accordance with the present invention, the relatively high die area, the relatively high power consumption, and the imprecision of analog RSSI modules are substantially overcome. As one of average skill in the art will appreciate, other embodiments may be derived from the teachings of the present invention without deviating from the scope of the claims.

What is claimed is:

1. A method for calculating a received signal strength indication (RSSI), the method comprises:
   digitally calculating a magnitude of a signal;
   filtering the magnitude to produce a filtered magnitude signal;
   determining a coarse RSSI value of the filtered magnitude signal, wherein the coarse RSSI value indicates a sliding window of RSSI values;
   determining a fine RSSI value within the sliding window of RSSI values by accessing a look up table to determine a corresponding reference level based on lower significant bits of the filtered magnitude signal, and equating the corresponding reference level to the fine RSSI value; and
   summing the fine RSSI value with the coarse RSSI value to produce an RSSI value that is used by a receiver to control at least one receiver parameter.

2. The method of claim 1, further comprises:
   converting a low intermediate frequency (IF) signal into a digital low IF signal;
   determining an in-phase (I) component and a quadrature (Q) component from the digital low IF signal; and
   determining the magnitude from the I and Q components, wherein the RSSI value corresponds to received signal strength of the low IF signal.

3. The method of claim 2, further comprises:
   determining an input RSSI value of a received radio frequency (RF) signal based on the RSSI value and intervening receiver gain, wherein the low IF signal is generated from the received RF signal and the intervening receiver gain.

4. The method of claim 1, wherein the determining a coarse RSSI value further comprises:
   evaluating, in a decreasing order, most significant bits of the filtered magnitude signal to determine the coarse RSSI value.

5. An apparatus for calculating a received signal strength indication (RSSI), the apparatus comprises:
   processing module; and
   memory operably coupled to the processing module, wherein the memory includes operational instructions that cause the processing module to:
   digitally calculate a magnitude of a signal;
   filter the magnitude to produce a filtered magnitude signal;
   determine a coarse RSSI value of the filtered magnitude signal by evaluating, in a decreasing order, most significant bits of the filtered magnitude signal to determine the coarse RSSI value, wherein the coarse RSSI value indicates a sliding window of RSSI values;
   determine a fine RSSI value within the sliding window of RSSI values by accessing a look up table to determine a corresponding reference level based on lower significant bits of the filtered magnitude signal, and equating the corresponding reference level to the fine RSSI value; and
   sum the fine RSSI value with the coarse RSSI value to produce an RSSI value that is used by a receiver to control at least one receiver parameter.

6. The apparatus of claim 5, wherein the memory further comprises operational instructions that cause the processing module to:
   convert a low intermediate frequency (IF) signal into a digital low IF signal;
   determine an in-phase (I) component and a quadrature (Q) component from the digital low IF signal; and
   determine the magnitude from the I and Q components, wherein the RSSI value corresponds to received signal strength of the low IF signal.

7. The apparatus of claim 6, wherein the memory further comprises operational instructions that cause the processing module to:
   determine an input RSSI value of a received radio frequency (RF) signal based on the RSSI value and intervening receiver gain, wherein the low IF signal is generated from the received RF signal and the intervening receiver gain.

8. An apparatus for calculating a received signal strength indication (RSSI), the apparatus comprises:
   processing module; and
   memory operably coupled to the processing module, wherein the memory includes operational instructions that cause the processing module to:
   digitally calculate a magnitude signal from a digital low intermediate frequency (IF) signal;
   determine a range of RSSI values from the magnitude signal; and
   determine an RSSI value within the range of RSSI values that is used by a receiver to control at least one receiver parameter, by accessing a look up table to determine a corresponding reference level based on lower significant bits of the magnitude, equating the corresponding reference level to a fine RSSI value, and summing the fine RSSI value with a boundary RSSI value of the range of RSSI values.

9. The apparatus of claim 8, wherein the memory further comprises operational instructions that cause the processing module to:
   determine an in-phase (I) component and a quadrature (Q) component from the digital low IF signal; and
   determine the magnitude signal from the I and Q components, wherein the RSSI value corresponds to received signal strength of the low IF signal.

10. The apparatus of claim 9, wherein the memory further comprises operational instructions that cause the processing module to:
   determine an input RSSI value of a received radio frequency (RF) signal based on the RSSI value and intervening receiver gain, wherein the digital low IF signal is generated from the received RF signal and the intervening receiver gain.

11. The apparatus of claim 8, wherein the memory further comprises operational instructions that cause the processing module to determine the range of RSSI values by:
   evaluating, in a decreasing order, most significant bits of the magnitude signal to determine the a boundary value of the range of RSSI values.

12. A radio frequency (RF) receiver comprises: low noise amplifier (LNA) operably coupled to amplify, based on an LNA gain setting, a received RF signal to produce an amplified RF signal;
   down-conversion module operably coupled to convert the amplified RF signal into a low intermediate frequency (IF) signal based on at least one local oscillation;
   filter stage operably coupled to filter the low IF signal to produce a filtered low IF signal;
   analog to digital converter operably coupled to convert the filtered low IF signal into a digital low IF signal;
   automatic gain control module operably coupled to generate the LNA gain setting based on a received signal strength indication (RSSI);
   processing module; and
   memory operably coupled to the processing module, wherein the memory includes operational instructions that cause the processing module to:
      digitally calculate a magnitude signal from the digital low IF signal;
      determine a range of RSSI values from the magnitude signal including evaluating, in a decreasing order, most significant bits of the magnitude signal to determine a boundary value of the range of RSSI values; and
      determine an RSSI value within the range of RSSI values that is used by a receiver to control at least one receiver parameter.

13. The RF receiver of claim 12, wherein the memory further comprises operational instructions that cause the processing module to:
   determine an in phase (I) component and a quadrature (Q) component from the digital low IF signal; and
   determine the magnitude signal from the I and Q components, wherein the RSSI value corresponds to received signal strength of the low IF signal.

14. The RF receiver of claim 13, wherein the memory further comprises operational instructions that cause the processing module to:
   determine an input RSSI value of a received radio frequency (RF) signal based on the RSSI value and intervening receiver gain, wherein the digital low IF signal is generated from the received RF signal and the intervening receiver gain.

15. The RF receiver of claim 12, wherein the memory further comprises operational instructions that cause the processing module to determine the RSSI value by:
   accessing a look up table to determine a corresponding reference level based on lower significant bits of the magnitude;
   equating the corresponding reference level to a fine RSSI value; and
   summing the fine RSSI value with a boundary RSSI value of the range of RSSI values.

16. A radio frequency (RF) receiver comprises:
   low noise amplifier (LNA) operably coupled to amplify, based on an LNA gain setting, a received RF signal to produce an amplified RF signal;
   down-conversion module operably coupled to convert the amplified RF signal into a low intermediate frequency (IF) signal based on at least one local oscillation;
   filter stage operably coupled to filter the low IF signal to produce a filtered low IF signal;
   analog to digital converter operably coupled to convert the filtered low IF signal into a digital low IF signal:
   automatic gain control module operably coupled to generate the LNA gain setting based on a received signal strength indication (RSSI);
   processing module; and
   memory operably coupled to the processing module, wherein the memory includes operational instructions that cause the processing module to:
      digitally calculate a magnitude of the digital low IF signal;
      filter the magnitude to produce a filtered magnitude signal;
      determine a coarse RSSI value of the filtered magnitude signal by evaluating, in a decreasing order, most significant bits of the filtered magnitude signal to determine the coarse RSSI value, wherein the coarse RSSI value indicates a sliding window of RSSI values;
      determine a fine RSSI value within the sliding window of RSSI values; and sum the fine RSSI value with the coarse RSSI value to produce an RSSI value that is used by a receiver to control at least one receiver parameter.

17. The RF receiver of claim 16, wherein the memory further comprises operational instructions that cause the processing module to:
   determine an in-phase (I) component and a quadrature (Q) component from the digital low IF signal; and
   determine the magnitude from die I and Q components, wherein the RSSI value corresponds to received signal strength of the low IF signal.

18. The RF receiver of claim 17, wherein the memory further comprises operational instructions that cause the processing module to:
   determine an input RSSI value of a received radio frequency (RF) signal based on the RSSI value and intervening receiver gain, wherein the low IF signal is generated from the received RF signal and the intervening receiver gain.

19. The RF receiver of claim 16, wherein the memory further comprises operational instructions that cause the processing module to determine the fine RSSI value by:
   accessing a look up table to determine a corresponding reference level based on lower significant bits of the filtered magnitude signal; and
   equating the corresponding reference level to the fine RSSI value.

* * * * *

UNITED STATES PATENT AND TRADEMARK OFFICE
CERTIFICATE OF CORRECTION

PATENT NO.         : 7,215,703 B2
APPLICATION NO. : 10/367492
DATED              : May 8, 2007
INVENTOR(S)        : Henrik T. Jensen and Brima B. Ibrahim Page 1 of 1

It is certified that error appears in the above-identified patent and that said Letters Patent is hereby corrected as shown below:

On the Title Page, Item (54)
Title should read: DIGITAL CALCULATION OF RECEIVED SIGNAL STRENGTH INDICATION Signed and Sealed this Sixth Day of November, 2007

JON W. DUDAS
*Director of the United States Patent and Trademark Office*

UNITED STATES PATENT AND TRADEMARK OFFICE
CERTIFICATE OF CORRECTION

PATENT NO. : 7,215,703 B2 Page 1 of 1
APPLICATION NO. : 10/367492
DATED : May 8, 2007
INVENTOR(S) : Henrik T. Jensen et al.

It is certified that error appears in the above-identified patent and that said Letters Patent is hereby corrected as shown below:

Column 9, line 57, in Claim 2: remove the comma after "claim 1"

Column 9, line 65, in Claim 3: remove the comma after "claim 2"

Column 11, line 20, in Claim 11: replace "the a boundary" with --the boundary--.

Column 12, line 46, in Claim 17: replace "die" with --the--.

Signed and Sealed this

Seventeenth Day of February, 2009

JOHN DOLL
*Acting Director of the United States Patent and Trademark Office*